United States Patent Office 3,486,946
Patented Dec. 30, 1969

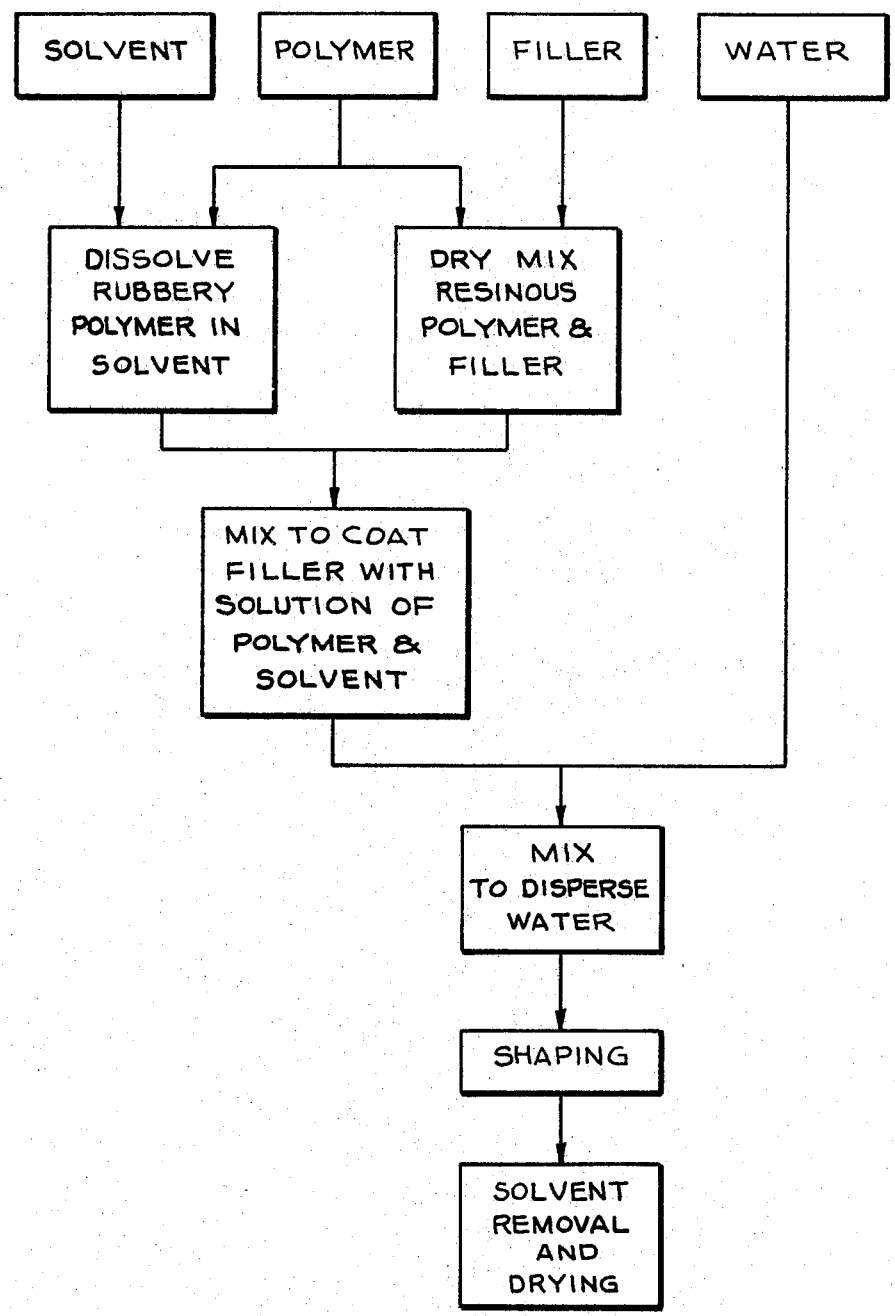

3,486,946
METHOD OF MAKING MICROPOROUS MATERIAL
Joseph C. Duddy, Trevose, Pa., assignor, by mesne assignments, to ESB Incorporated, Philadelphia, Pa., a corporation of Delaware
Filed Oct. 4, 1966, Ser. No. 584,177
Int. Cl. H01m 31/00
U.S. Cl. 136—175          8 Claims

ABSTRACT OF THE DISCLOSURE

A method of manufacturing a microporous material comprising a substantially continuous phase of a polymeric material supported by a substantially continuous phase of a filler material to provide a matrix having interconnected micropores. The method comprises mixing a filler material, a polymer, a solvent and water to form an emulsion throughout which are suspended water droplets and the filler particles are coated with a solution of polymer and solvent. In a series of drying steps the solvent and water are evaporated from the mixture at a temperature below 100° C. to form micropores throughout the mixture.

---

This invention relates to a method for making microporous thermoplastic materials containing a permanent filler.

While not limited thereto, the method of the present invention is particularly adapted to the manufacture of microporous thermoplastic battery separators. One process for manufacturing battery separators of this type is described and claimed in U.S. Patent No. 2,542,527, issued Feb. 20, 1951, to E. M. O. Honey et al. In this process, a dough which is capable of being formed into the desired shape, is produced by incorporating a finely divided pore-forming agent into a suitable thermoplastic resin which has been plasticized by a solvent. The dough thus produced is then shaped and the solvent is removed from the resin. Following the solvent removal, the pore former is removed by a leaching process leaving the shaped material microporous. While this process produces excellent microporous material, it has never been widely adapted in this country for the production of battery separators because the leaching process required to remove the pore-forming agent is both time-consuming and expensive.

Another process for making microporous thermoplastic battery separators is described and claimed in U.S. Patent No. 2,564,397, issued Aug. 14, 1951, to J. C. Duddy. In this process, a permanent pore-filler substance, such as diatomaceous earth, is incorporated into a thermoplastic resin matrix. The matrix is produced by sintering discrete particles of the thermoplastic resin at an elevated temperature. This process also has not been widely adopted for commercial use perhaps because of the elevated temperatures required for the sintering of the thermoplastic resin matrix material.

U.S. Patent No. 2,772,322, issued Nov. 27, 1956, to H. S. Witt et al. describes still another method for manufacturing thermoplastic battery separators. In this process, silica hydrogel, a thermoplastic resin and a suitable solvent for the resin are mixed together to obtain a dough which is shaped by calendering or extrusion. The solvent is then removed from the shaped mixture under such conditions that the water in the hydrous silica gel is not removed until after the thermoplastic matrix is rigid and form-sustaining. The product produced is described as a continuous matrix of the thermoplastic resin permeated throughout by interconnecting particles of porous dehydrated silica hydrogel. The thermoplastic matrix is a continuous structure independent of any adherence between the silica gel particles and the thermoplastic resin matrix. As a result, the silica gel has no structural function in the product, and the product lacks the compressive strength to resist the compression caused by the expansion of the battery electrodes during cycling.

It is an object of the present invention to provide a new and improved method of producing microporous thermoplastic material which is suitable for use as battery separators.

It is another object of the present invention to provide a method for producing microporous thermoplastic material which does not utilize the elevated temperatures or the leaching step of the prior art processes.

A further object of the present invention is to provide a means for producing microporous thermoplastic material having a network of interconnected pores in which a substantially continuous phase of the thermoplastic polymer is reinforced and supported by a substantially continuous phase of an inert granular filler material.

In the process of the present invention, a thermoplastic polymer, a suitable solvent for the polymer and finely divided diatomaceous earth are mixed to produce a dough-like mixture in which the particles of diatomaceous earth are surrounded and coated by a solution of the polymer and solvent. Water is then added to and dispersed throughout the mixture in a fine discontinuous phase. This mixture is then shaped as by calendering or extrusion and dried at a temperature below the boiling point of the liquid portions of the mixture. During the drying step, the shaped mixture is supported to prevent relative motion by the particles of diatomaceous earth during the removal of the solvent from the mixture. The process produces a microporous material having interconnected pores which comprises a substantially continuous matrix phase of the thermoplastic polymer reinforced by a substantially continuous phase of the filler. This filler reinforced matrix surrounds and maintains the interconnected pore volume produced by the removal of the solvent and the water. Unlike the products produced by the prior art processes in the product of the present invention, the continuity of the resin phase and the continuity of the filler phase are such that either may be removed as by pyrolysis of the resin or alkali extraction of the diatomaceous earth without destroying the continuity of the residue.

The flow sheet of the drawing illustrates the combination of process steps claimed.

Thermoplastic polymers which are suitable for use in this process must be capable for forming a liquid solution with a solvent which is sufficiently immiscible with water to form two distinct phases in the mixture. Polyvinyl chloride, vinyl chloride-vinyl acetate copolymers and mixtures of these materials with butadiene acrylonitrile copolymers, neoprene and chlorinated rubber are some of the polymeric materials which may be utilized. Polystyrene resin and polystyrene butadiene resin and mixtures of these materials with rubbery butadiene styrene copolymers are also suitable for use as matrix polymers.

The process of the present invention requires a good solvent or a good solvent combination in order to provide a complete solution of the matrix polymer for coating the silica particles and for the formation of a continuous polymer phase which will surround and hold droplets of water during the mixing step. Still further, a solvent suitable for use in the process of the present invention must be sufficiently insoluble in water that the amount of solvent which will remain in the polymer phase of the emulsion after the addition of water will be adequate to provide a viscous polymer solution capable of holding the water droplets. Some solvents and solvent combinations suitable for carrying out the present invention include aliphatic, cyclic and aromatic ketones, aliphatic esters, particularly those containing less than 10 carbon atoms per molecule, and blends of the above material with aromatic hydrocarbons such as benzene, xylene and toluene. Specific examples of such solvents are the following: Methyl isobutyl ketone, mesityl oxide, isophorone, ethyl acetate 87%–90%, methyl ethyl ketone, methyl acetate 82%, cyclohexanone and acetone. Some other suitable solvents are 2 nitropropane, nitroethane, tetrahydrofuran, dimethyl formamide and nitromethane. Preferred solvents and solvent combinations are those which have boiling points below 100° C., either individually or as low-boiling azeotropes with water so as to permit solvent removal at a temperature below 100° C. In this respect water is a pore-forming agent and hence, it is essential that during drying sufficient solvent is removed from the resin to establish a binding polymer matrix prior to the removal of the water or a loss of porosity will result. Specific preferred solvents for use with all of the polymeric materials listed herein before except for polyvinyl chloride are: Methyl ethyl ketone, blends of methyl ethyl ketone with benzene and toluene and methyl isobutyl ketone.

The preferred form of finely divided diatomaceous earth used in carrying out the present invention is flux calcined diatomite powder. This material is prepared from naturally occurring deposits of marine-type diatomaceous earth by grinding the mineral to a fine powder and calcining it at a high temperature with soda ash so as to obtain a product which is practically pure amorphous silica. In the specific examples of the present invention which are described in detail hereinafter, the diatomaceous earth powder utilized had particle sizes such as would pass through a 325 mesh screen. This material had an average particle size of 3 microns.

A better understanding of the present invention may be had from the following description when read with reference to the accompanying drawing which is a flow diagram of the process of the present invention.

EXAMPLE I

There are three major operations in the process of the present invention: Mixing, shaping and drying. During the mixing operation, there is first produced a dough-like mixture in which the finely divided particles of diatomaceous earth are coated and surrounded by a solution of the thermoplastic polymer and solvent. Water is then added to this mixture to produce an emulsion in which the water is dispersed in fine droplets, that is, a discontinuous phase, throughout a continuous phase which comprises the mixture of thermoplastic polymer, solvent and diatomaceous earth. In order to produce a uniform emulsion in the shortest time from a given batch of material, it is preferable that the mixing operation be carried out in the discrete steps shown in the flow diagram. In this respect, it has been found preferable to dry mix the diatomaceous earth and dry polymer prior to dissolving the polymer in the solvent. Aside from the obvious blending achieved by dry mixing the polymer and the diatomaceous earth, it has been found that the diatomaceous earth particles physically separate the individual granules of polymer so that they will be readily acceptable to the solvent during the subsequent mixing operation. This permits the polymeric granules to dissolve rapidly and form a true solution of the polymer which will coat the silica rapidly rather than agglomerate when the solvent is added.

When the polymer content of the formulation includes a rubbery polymer, it has been found desirable to dissolve this polymer in a portion of the solvent prior to the addition of the solvent to the mixture of polymer and diatomaceous earth. This is due to the fact that the rubbery polymers are generally available in the form of coarse chips or slabs as opposed to the granular form of commercially available resin polymers and are, hence, more difficult to dissolve into solution.

In the processing of a specific formulation including a rubbery polymer, 200 parts by weight of flux calcined diatomaceous earth was dry mixed with 80 parts by weight of a vinyl chloride vinyl acetate copolymer, a resinous material. 20 parts by weight of a butadiene acrylonitrile copolymer, a rubbery polymer, was added to 80 parts by weight of methyl ethyl ketone and mixture was stirred. The solution thickened as the polymer dissolved and agitation was continued until the solution was uniform. More efficient mixing, however, can be obtained by allowing the mixture to stand for several hours following the thickening of the solution. After standing, an additional five or ten minutes of stirring produces a uniform solution. In either case the viscous solution can then be diluted by adding the remainder of the solvent. With this formulation, the solution was diluted by adding an additional 142 parts by weight of methyl ethyl ketone. This brought the total amount of solvent in the formulation to 222 parts by weight.

The solution of solvent and rubbery polymer was then mixed with the premixed blend of resinous polymer and diatomaceous earth. This mixing step was accomplished in an enclosed mixer and the resinous polymer dissolved almost instantaneously. A three-minute mixing operation produced a somewhat sticky paste free from dry spots or lumps in which the individual diatomaeous earth particles were surrounded and coated by the solution of resin and solvent.

Next 180 parts by weight of water were added to the mixture in the enclosed mixer. The mixing was then continued for 10 minutes to produce an emulsion in which the water was completely absorbed and dispersed in fine droplets throughout the mixture of polymers, solvent, and diatomaceous earth.

Calendering is the preferred method of producing battery separators by means of the present invention because it can be carried out continuously. To prevent evaporation of the solvent from the emulsion produced in the mixing operation, this material is preferably fed to the calendering rolls from an enclosed hopper. The temperature of the calendering rolls will depend on the particular polymer or combination of polymers of the formulation, but temperatures in the range of between 20° C. and 40° C. have been found suitable for most of the materials specified. For ribbed battery separators one of the calendering rolls may be profiled. It has been found desirable when using a profile roll to maintain the temperature of the smooth roll of the calender about 10° C. lower than that of the profile roll. Once the material has been started through the calender, it will continue to feed without difficulty as long as the calender rolls are maintained at the proper temperatures.

The calendered material must be supported as it comes from the calender rolls. For this purpose a belt of stainless steel wire cloth having 330 x 120 mesh was fed between the calender rolls. This belt was pre-wet by passing it through a water trough as it was fed into the calender to prevent excessive penetration of the separator material into the meshes of the belt.

The calendered material produced as described above was then dried in a tunnel dryer with the material supported during the drying operation by the stainless steel cloth belt, on which it was fed from the calender rolls. To avoid the formation of blisters, the drying was carried out at a temperature below the boiling point of the solvent and the solvent-water azeotrope. For most formulations, the separator material having the best mechanical properties has been obtained when the drying temperature of the material was maintained below 75° C. until all of the solvent was removed.

In this example, the separators which were produced were of the standard automotive type and calendered by means of a profiled calender roll to produce separator material embossed with 19 ribs of which the 2 outside ribs were approximately 2 times the width of the other ribs. The total thickness of the ribs was 0.076 inch with a web thickness of 0.02 inch. The material was dried in a tunnel dryer 30 feet long. The temperature in the dryer was as high as 130° C. but a high velocity of air blown through the dryer maintained the temperature of the separator material at or below 73.6° C. by evaporation. The material moved through the dryer in a straight line at a rate of 6 feet per minute. Separators 4 13/16 inches high and 5 27/32 inches wide were then cut from the sheet material as it emerged from the dryer. These separators had a porosity of 66% and a resistivity of 0.024 ohm per square inch.

EXAMPLE II

The following example is typical of a formulation utilizing a vinyl chloride vinyl acetate copolymer without the addition of a rubbery polymer.

Ingredient: Parts by weight
- Vinyl chloride vinyl acetate copolymer _____ 100
- Diatomaceous earth _____ 200
- Methyl ethyl ketone _____ 276
- Water _____ 170

This formulation was processed in a manner similar to the processing described in connection with Example I except that since there was no rubbery polymer in the formulation all of the polymer was premixed with the diatomaceous earth filler. Mixing, mixing times, calendering temperatures and conditions as given in connection with Example I were utilized to produce battery separators from this formulation.

EXAMPLE III

In accordance with this formulation battery separators were produced utilizing a polystyrene resin.

Ingredient: Parts by weight
- Polystyrene _____ 200
- Diatomaceous earth _____ 200
- Solvent _____ 126
- Water _____ 198

In the preparation of this formulation the mixing was carried out without dry mixing the polymer and the diatomaceous earth. The polystyrene resin utilized was in the form of beads having a size such as would pass through a 200 mesh screen. To facilitate the mixing, the resin was dissolved in the solvent and mixed with the filler in solution. Then the water was added to and mixed therein to produce an emulsion. This emulsion was then used to encapsulate a battery element by means of doctor blade trowling technique. In this process a layer of the emulsion was spread across the surface of each electrode, and the electrodes stacked to form an element. The element was then coated on all sides with the emulsion and wrapped in wet kraft paper. The encapsulated element was then dried in an oven at a temperature of 70° C. for a period of 3 hours. After drying the kraft paper was removed from the encapsulated element and it was ready for assembly into a battery. Other elements were encapsulated in a manner similar to that described above, however, 0.05 inch mats of fiber glass were inserted adjacent to the positive electrodes to give better electrolyte retention at the positive electrodes. Encapsulated battery elements made in this manner were strong, solid elements which were dimensional stable and able to be fitted with ease into battery containers.

EXAMPLE IV

The formulation of this example was used to produce battery separators of microporous polyvinyl chloride.

Ingredients: Parts by weight
- Polyvinyl chloride _____ 200
- Diatomaceous earth _____ 400
- Methyl ethyl ketone _____ 560
- Water _____ 280
- Triton X–100 wetting agent _____ 1.50

In the processing of this formulation the diatomaceous earth and polyvinyl chloride resin were dry mixed as described in connection with Example I. The polyvinyl chloride was in the form of beads such as would pass through a 120 mesh screen. To simplify the mixing operation the water and methyl ethyl ketone were mixed and heated to 40° C. prior to mixing them with the diatomaceous earth and polyvinyl chloride. After sufficient mixing to achieve the desired emulsion, the material was calendered on wet kraft paper which was passed through the calendering rolls with the emulsion to produce material suitable for use as battery separators. Following the calendering the kraft paper was stripped from the sheet material which was then allowed to stand at room temperature for one hour. Following the one hour stand the sheet material was placed on an insulated hot plate heated to 115° C. to complete the drying.

EXAMPLE V

The following is an example of a formulation in which polyvinyl chloride resin was modified by a butadiene acrylonitrile copolymer to produce battery separators.

Ingredients: Parts by weight
- Polyvinyl chloride _____ 80
- Butadiene acrylonitrile copolymer _____ 20
- Diatomaceous earth _____ 200
- Tetrahydrofuran _____ 370
- Water _____ 70

In the processing of this formulation the polyvinyl chloride resin was dry mixed with a diatomaceous filler and the butadiene acrylonitrile copolymer was predissolved in the tetrahydrofuran solvent in accordance with the procedure described in connection with Example I. However, the solvent was heated to 50° C. and the mixing was carried out in a heated mixer also heated to a temperature of 50° C. Other modifications of the processing was the addition of water heated to 50° C. to produce the emulsion and the sheeting of the emulsion on wet kraft paper which was fed through the calendered rolls with the mix.

The formulations described hereinbefore are illustrative only of specific embodiments of the formulations which can be utilized by carrying out the process of the present invention. These formulations may be varied within certain limits which will be discussed hereinafter.

The process of the present invention is applicable for producing battery separators having a variety of characteristics. Where desired, reinforced separators may be made by feeding backing material, such as glass mat of appropriate thickness, through the calender rolls. Similarly, polyethylene, polypropylene or other types of electrolyte resistant netting of various sizes may be fed through the calender rolls and, thus, embedded in the separator material coming from the rolls. The calendered material may also be supplied as a coating to conventional separator material by saturating such separator material with water and passing it through the calendering rolls. When producing a coating of calendered material in this manner it has been found desirable to feed wet kraft paper between the rolls with the saturated separators so that the calendered material is sandwiched between them. Immediatelly after the calendering the kraft paper is stripped off the coated separators.

Formulations designed for spread coating, such as the formulation of Example III, are more liquid than those used for calendering. The increased fluidity is obtained by increasing both the solvent and the water content of the mixture. It is necessary in such mixtures to strike a balance between the amount of water and the amount of solvent so that the water content of the mixture is high enough to both saturate the resin solvent solution and to provide the excess necessary to form a dispersed water phase in the emulsion. For this purpose an emulsifying agent may be helpful.

The physical characteristics of the separator material may also be varied by varying the type of polymer utilized as well as the ratio of polymer to filler. For more flexible separators the polymer content of a formulation can be moderate by the addition of a rubbery polymer such as the butadiene, acrylonitrile polymer of Example I. Separators made of straight resinous type polymers tend to be stiffer than separators including a rubbery polymer but they are also less compressible. It has also been found that the portion of diatomaceous earth to polymer used in the formulation may be varied from 0.75 to 2.25 parts by weight of polymer. The addition of a larger proportion of filler permits the incorporation of correspondingly larger proportions of water which results in increased porosity. However, the addition for filler beyond the proportions indicated will not produce mechanically suitable material.

The theoretical pore volume of the material produced in accordance with the process of the present invention is equal to the combined volume of the solvent and water present in the formulation. In actual practice the theoretical pore volume can be achieved within one or two percent. Handleable sheet material suitable for battery separators has been produced from formulations having a solvent and water content as high as 75% by volume of the formulation. Thus, the total content of water and solvent in the formulation may be as high as 75% by volume of the formulation.

It is very important to note that the mechanical properties of separator material made in accordance with the process of the present invention are adversely affected by any flexing, twisting, stretching or compression of the material during the drying process. All handling operations and equipment should be designed to avoid stresses on the material or relative motion in the material during the critical interval between shaping and substantial removal of solvent. This means among other things that calendered separators must be carried from the calender through the drying oven in a straight line and that they cannot be flexed around corners during the drying. It is also essential that they are supported on means which will not expand or contract to any significant degree as it goes from the calender through the drying oven.

As stated hereinbefore, battery separators made in accordance with the process of the present invention comprise a thermoplastic resin matrix reinforced with a matrix of diatomaceous earth. The interconnected pores of the separators are produced by removal of solvent and water from this resin reinforced matrix. These separators are chemically inert, have low electrical resistance, high compressive strength and are also characterized by an almost complete lack of shrinkage or dimensional change under the influence of heat. The low electrical resistance of the separators is due to their porosity which can be closely controlled by varying the formulation used in carrying out the process. The process for making these separators is characterized by simplicity and economy of production. Still further, it does not require the leaching step or high sintering temperatures of prior art processes.

Having described this invention, that which is claimed as new is:

1. A method of producing microporous materials having interconnected pores comprising the steps of preparing a dough-like viscous emulsion of a thermoplastic polymer, a good solvent for said polymer, diatomaceous earth, and water in which the water is dispersed in fine droplets throughout a mixture comprising the diatomaceous earth particles coated with a solution of the polymer and the solvent, said polymer being selected from the group consisting of polyvinyl chloride, vinyl chloride-vinyl acetate copolymers, mixtures of these materials with butadiene acrylonitrile copolymers, neoprene and chlorinated rubber, polystyrene resin, polystyrene butadiene resin and mixtures of these materials with rubbery butadiene styrene copolymers, said diatomaceous earth being present in the emulsion in an amount of from 0.75 to 2.25 parts by weight of the polymer, said solvent being sufficiently insoluble in water so that both a solvent-resin phase and a water phase are present in an amount that will provide a 20% to 35% solution of the polymer, said water and said solvent comprising not more than 75% by volume of said emulsion, shaping said mixture, evaporating the solvent from said shaped mixture at a temperature below the boiling point of water, said shaped mixture being supported during the removal of the solvent to prevent relative motion between the particles of diatomaceous earth and further drying said materials to produce a microporous matrix comprising a substantially continuous phase of thermoplastic polymer reinforced and supported by a substantially continuous phase of the diatomaceous earth.

2. The process of claim 1 in which said solvent has a boiling point below 100° C., either individually or as an azeotrope with water.

3. A method of producing microporous thermoplastic separators comprising the steps of preparing a dough-like viscous emulsion of a thermoplastic polymer, a good solvent for said polymer, diatomaceous earth and water in which the water is dispersed in fine droplets throughout a mixture comprising the diatomaceous earth particles coated with a solution of the polymer dissolved in the solvent, said polymer being selected from the group consisting of vinyl acetate copolymers, mixtures of these materials with butadiene acrylonitrile copolymers, neoprene and chlorinated rubber, polystyrene resin, polystyrene butadiene resin and mixtures of these materials with rubbery butadiene styrene copolymers, said diatomaceous earth being present in the emulsion in the amount of 0.75 to 2.25 parts by weight of the polymer, said solvent being sufficiently insoluble in water to remain in the polymer phase of the emulsion in an amount adequate to provide a viscous polymer phase capable of holding water as droplets and present in an amount that will provide a 20% to 35% solution of the polymer, said water and said solvent comprising not more than 75% by volume of said emulsion, calendering said emulsion to produce sheet material, drying said sheet material at a temperature below the boiling point of water and cutting battery separators from said sheet material.

4. The process of claim 3 in which said solvent is selected from the group consisting of methyl ethyl ketone, methyl isobutyl ketone and blends of methyl ethyl ketone with benzene and toluene.

5. A method of producing microporous thermoplastic battery separators comprising the steps of mixing a polymer selected from the group consisting of polyvinyl chloride, vinyl chloride-vinyl acetate copolymers, mixtures of these materials with butadiene acrylonitrile copolymers, neoprene and chlorinated rubber, polystyrene resin, polystyrene butadiene resin and mixtures of these materials with rubbery butadiene styrene copolymers, sufficient solvent for said polymer to provide a 25% to 35% solution of the polymer, and diatomaceous earth in an amount of 0.75 to 2.25 parts by weight of said polymer to provide a mixture in which the particles of diatomaceous earth are coated with a solution of the polymer in the solvent, said solvent being substantially insoluble in water, mixing water into said mixture to produce an emulsion in which the water is dispersed in fine droplets throughout said mixture, calendering said mixture to produce sheet material, removing the solvent from said sheet material at a temperature below the boiling point of water, further drying said sheet material and cutting battery separators from said dried sheet material.

6. The process of claim 5 in which said solvent has a boiling point below 100° C., either individually or as an azeotrope with water.

7. A method of producing battery separators comprising the steps of dry mixing about 4 parts by weight of vinyl chloride vinyl acetate resin with about 10 parts by weight of diatomaceous earth to produce a dry blend, dissolving about 1 part by weight of a butadiene acrylonitrile resin in about 11 parts by weight of methyl ethyl ketone to produce a solution, mixing said dry blend with said solution to produce a mixture in which said diatomaceous earth particles are surrounded and coated with a solution of said resins in said methyl ethyl ketone, mixing about 9 parts by weight of water into said mixture to produce an emulsion in which the water is dispersed throughout said mixture in fine droplets, calendering said emulsion to produce sheet material, evaporating the solvent from said sheet material at a temperature below 100° C. further drying said sheet material and cutting battery separators from said dried sheet material.

8. A method of making battery separators in place in a battery element comprising two electrodes, comprising the steps of mixing a polymer selected from the group consisting of polyvinyl chloride, vinyl chloride-vinyl acetate copolymers, mixtures of these materials with butadiene acrylonitrile copolymers, neoprene, and chlorinated rubber, polystyrene resin, polystyrene butadiene resin, and mixtures of these materials with rubbery butadiene-styrene copolymers, sufficient solvent for said polymer to provide a 20%–35% solution of the polymer, and diatomaceous earth in an amount of 0.75–2.25 parts by weight of said polymer to provide a mixture in which the particles of diatomaceous earth are coated with a solution of a polymer in the solvent, said solvent being substantially insoluble in water, mixing water into said mixture to produce an emulsion in which the water is dispersed in fine droplets throughout the mixture, applying said emulsion across the surface of each electrode, stacking said electrode to form said element, applying said emulsion on all sides of said element and drying said element at a temperature below the boiling point of water.

References Cited

UNITED STATES PATENTS

| 2,564,397 | 8/1951 | Duddy | 264—41 XR |
|---|---|---|---|
| 2,864,777 | 12/1958 | Greenhoe. | |
| 2,960,728 | 11/1960 | Beer. | |
| 3,296,016 | 1/1967 | Murphy | 264—49 |
| 3,023,261 | 2/1962 | Louis et al. | 136—146 XR |
| 3,210,218 | 10/1965 | Kawai et al. | 136—146 XR |
| 3,418,168 | 12/1968 | Wentworth. | |

PHILIP E. ANDERSON, Primary Examiner

U.S. Cl. X.R.

117—201; 136—146, 148; 156—280, 296; 260—2.5; 264—41, 53